United States Patent Office

3,329,641
Patented July 4, 1967

3,329,641
PATCHING COMPOSITION CONTAINING POLYVINYL AND EPOXY RESINS WITH HYDRAULIC CEMENT
Michael Michaels, Bridgeport, Conn., assignor to Silcoa Products, Inc., New York, N.Y., a corporation of New York
No Drawing. Filed Apr. 2, 1965, Ser. No. 445,250
9 Claims. (Cl. 260—31.2)

This invention relates to a novel patching composition. More particularly, this invention relates to a particulate vinyl-concrete patching composition for concrete finishing, patching and general repair work, which composition contains a minor amount of epoxy resin.

It is an object of the present invention to provide a particulate dry patching composition which, upon the addition of water, can then be applied, e.g., as a resurfacing layer for a base material such as concrete, brick, tile, glass, marble or metal, and will rapidly set to a hard, water-resistant, impermeable surface layer that is tenaciously bonded to the base material.

In accordance with one aspect of my invention, I have found that when a minor but effective amount of an epoxy resin is spray-coated upon a particulate material and the thus coated particles are then mixed with cement and vinyl resin in certain specified proportions, there results a particulate patching composition which, upon the addition of water to form a composition of grout-like or butter-like consistency, can be applied as a patching composition for a base material, and will rapidly set to a tough, hard, water-resistant layer that is firmly and tenaciously bonded to the base material.

The epoxy resins which may be utilized in my invention are in the form of sprayable liquids and may range in viscosity from mobile liquids to relatively viscous liquids, depending upon the molecular weight of the particular epoxy resin. Thus, molecular weight is not a critical consideration so long as the liquid epoxy resin is, in fact, sprayable.

Epoxy resins are, of course, well known, and are characterized by the presence of terminal epoxide groups,

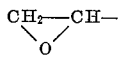

and by the existence of alternating aromatic and aliphatic groups throughout their length, the aliphatic and aromatic groups being joined to one another through an oxygen atom. Epoxy resins are typically made by the reaction of a dihydric phenol, e.g., bis-phenol A,

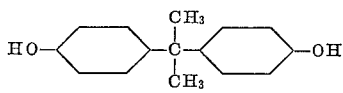

with a glycidyl compound such as epichlorohydrin,

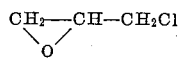

Thus, the chemical structure of a typical epoxy resin suitable in the compositions of my invention may be illustrated as follows:

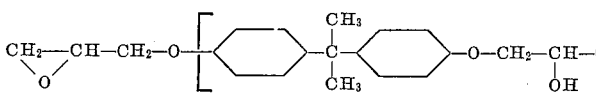

wherein $n$ is an integer equal to 1 or greater, and more usually will be from about 2 to 300.

The foregoing liquid epoxy resin is spray coated upon an appropriate particulate material. While a great number of particulate materials have heretofore been employed as components of a cementitious composition, e.g., titanium dioxide, metal oxides such as iron oxide, asbestos, clays, etc., I have found that best results are attained by the use of sand ($SiO_2$).

The sand particles should desirably be sub-angular in nature. Coating of the sand particles with epoxy resin is readily accomplished by spraying the liquid epoxy resin upon the sand particles while they are being tumbled, the spraying conveniently being carried out at room temperature. It is desirable that the spraying and tumbling be carried out in a dry environment so as to avoid premature introduction of water into the system. Thus, the spraying may be performed in a sealed mill. The resulting epoxy-coated sand particles are promptly blended with the other components of my patching composition, as described hereinafter, and the finished particulate composition sealed in air-tight containers so as to prevent any access to water vapor.

The epoxy-coated sand particles are but one component of my vinyl-cementitious patching composition. The other components generally include portland cement, lime (calcium oxide), calcium chloride, vinyl resins such as polyvinyl alcohol and polyvinyl acetate, a plasticizer such as e.g. anhydrous sodium acetate, and a wetting agent such as e.g. a sodium salt of a condensed aryl sulfonic acid.

An example of a particularly desirable formulation for the patching composition of my invention is as follows:

| Component: | Parts by weight |
|---|---|
| "A" sand | 526 |
| "OON" sand | 506 |
| High early cement | 100 |
| Portland cement | 374 |
| Lime | 6.25 |
| Polyvinl alcohol (e.g., "Gelvatol 2030") | 10.5 |
| Polyvinl acetate (e.g., "Gelva Powder 700") | 27.0 |
| Calcium chloride | 13 |
| Wetting agent (e.g., neutral sodium salt of a condensed aryl sulfonic acid, "Tamol S.N.") | 4.0 |
| Plasticizer (e.g., anhydrous sodium acetate, "Niacet") | 2.75 |
| Epoxy resin (e.g., polymeric diglycidyl ester of bis-phenol A, "Polytex 611–Q")[1] | 1.57 |

[1] The liquid epoxy resin is not added as such, but rather is spray coated upon the particulate A sand and OON sand.

In general, I have found that the following ranges may be utilized for each of the above components: sub-angular sands, 45 to 75% by weight; cements, 20 to 35% by weight; lime, 0.3 to 3% by weight; polyvinyl acetate, 1 to 6% by weight; polyvinyl alcohol, 0.5 to 5% by weight; calcium chloride, 0.3 to 3% by weight; wetting agent, 0.1 to 1% by weight; plasticizer, 0.1 to 1% by weight; epoxy resin, 0.05 to 1% by weight, and preferably 0.07 to 0.3% by weight.

After the sand has been spray-coated with epoxy resin (by the tumbling procedure described previously) the coated sand particles are blended, along with each of the various components referred to above, in a ribbon mixer until a uniform particulate mixture is obtained, this generally requiring twenty minutes to a half hour.

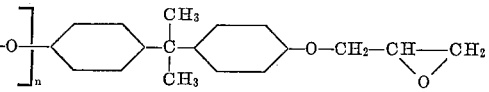

The particulate product is then packaged in an air-impervious container so as to prevent exposure to water vapor prior to actual admixture with water for application to the surface to be patched or finished.

For using the patching composition of my invention, desirably about ten pounds of the packaged particulate mixture is mixed in about 1½ to 2 pints of water. The mixture is stirred and should then be allowed to stand for from about ten to twenty minutes before application. The material is then stirred once again, and its consistency adjusted, if necessary, either by adding a little more water or by adding a little more of the patching composition, until a grout-like or butter-like consistency is obtained.

When the resulting patching composition is applied, e.g., cast into a form so as to replace a sidewalk section, or applied as a thin layer for resurfacing, the cement proceeds to rapidly take up water and "set". As the "setting" continues, and although there is not present in the composition such a conventional epoxy "hardener" as an organic polyamine, there nevertheless occurs a curing of the epoxy resin. This curing of he epoxy is shown by the unusual degree of adherence as between the pacthing material and the surface to which it is applied, as well as by increased resistance to water, petrochemicals, alkalis, and acids, and a toughness and improved resistance to wear. While the exact curing mechanism of the epoxy resin is not fully understood, it is believed to occur by the abstraction of water molecules from hydroxyl groups present throughout the epoxy resin, leading to the formation of cross-links and hence to a complete curing of the epoxy resin.

A particularly advantageous feature of my invention is that my patching compositions (after water has been added) can be troweled to a very thin layer, e.g., of the order of about one sixteenth of an inch. Thus, ten pounds of my patching composition can be used to cover an area of the order of 20 square feet, yet the resulting thin surface will cure to a layer that exhibits unusual toughness, great water-impermeability, and which is tenaciously bonded to the base surface.

Variations can, of course, be made from the above illustrative description without departing from the spirit of my invention.

Having thus described my invention, what I desire to secure and claim by Letters Patent is:

1. A substantially air-tight packaged particulate composition comprising, in parts by weight: from about 45 to 75 parts sand; from about 20 to 35 parts cement; from about 0.3 to 3 parts lime; from about 1 to 6 parts polyvinyl acetate; from about 0.5 to 5 parts polyvinyl alcohol; from about 0.1 to 1 part wetting agent; from about 0.1 to 1 part plasticizer; and from about 0.05 to 1 part of epoxy resin, said epoxy resin having been prepared by reacting a dihydric phenol with an epihalohydrin and being present in the form of a coating for said sand.

2. The composition of claim 1 wherein said wetting agent is the sodium salt of a complex condensed organic acid.

3. The composition of claim 1 wherein said plasticizer is anhydrous sodium acetate.

4. The composition of claim 1 wherein the amount of said epoxy resin is from about 0.07 to 0.3 part.

5. The composition of claim 1 wherein said epoxy resin is the reaction product between epichlorohydrin and bis-phenol A.

6. The composition of claim 1 wherein said sand is sub-angular.

7. The composition of claim 1 wherein said cement is made up of a mixture of portland cement and high early strength portland cement.

8. The composition of claim 1 wherein said epoxy resin is the reaction product between epichlorohydrin and bis-phenol A and is represented by the formula

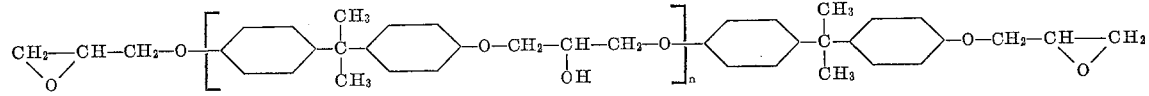

wherein $n$ is an integer of at least 1.

9. The composition defined by claim 8 wherein $n$ is an integer of from about 2 to 300.

References Cited
UNITED STATES PATENTS

| | | | |
|---|---|---|---|
| 1,644,694 | 10/1927 | Welch | 106—90 |
| 2,576,955 | 12/1951 | Ludwig | 260—41 |
| 2,733,995 | 2/1956 | Robinson | 260—41 |
| 3,198,758 | 8/1965 | Donnelly | 260—37 |

MORRIS LIEBMAN, *Primary Examiner.*

L. T. JACOBS, *Assistant Examiner.*